E. BIGNELL.
CONSTRUCTION OF AND METHOD OF SINKING PILES.
APPLICATION FILED OCT. 9, 1919.

1,435,144. Patented Nov. 14, 1922.

Witness:
John Enders
Merrill M. Blackburn

Inventor:
Edward Bignell,
by Wallace R. Lane
Atty.

Patented Nov. 14, 1922.

1,435,144

UNITED STATES PATENT OFFICE.

EDWARD BIGNELL, OF LINCOLN, NEBRASKA, ASSIGNOR TO CONCRETE PILING COMPANY, OF SEWARD, NEBRASKA, A CORPORATION OF NEBRASKA.

CONSTRUCTION OF AND METHOD OF SINKING PILES.

Application filed October 9, 1919. Serial No. 329,623.

*To all whom it may concern:*

Be it known that I, EDWARD BIGNELL, a citizen of the United States, residing at Lincoln, in the county of Lancaster and State of Nebraska, have invented certain new and useful Improvements in the Construction of and Methods of Sinking Piles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the construction of and method of sinking piling, sheet piling, caissons, or any structure which is adapted to be entirely or partially sunk in the earth to serve as a foundation for a superstructure, or obstruction, such as a dike, breakwater or the like, and which will be hereinafter referred to merely as piling, although I do not wish to be understood as limiting the use of the method to the specific structure ordinarily understood by that term, the present application relating to an improvement in the structures and method disclosed and claimed in my prior Patents, Nos. 1,241,813, 1,185,582, 1,182,134, and 1,024,820.

More particularly the invention relates to the construction of and method of sinking piles which have previously been formed or molded from a plastic material, such as cement or concrete, and are carried to the work and lowered to position partially by their own weight and partially by artificial displacement of the earth in advance thereof.

Essentially my invention consists in increasing the rate and effectiveness at which the clay, sand, gravel, etc., hereinafter referred to generically as soil, is removed from in front of the piling, and the apparatus whereby this result may be attained.

I have discovered that it is necessary to increase somewhat, for most effective operation, the flow of water in the vicinity of the forward end of the piling in order to cut out rapidly the soil in front of the piling, and I have therefore modified my structures above referred to by increasing the size of the exit aperture for the water, in the devices of the earlier patents. By arranging the lower set of tubes of the later patent so that the water will be directed forwardly to thereby quickly cut away the soil in front of the piling and permit the latter to settle in the earth more rapidly, I have accomplished the same result.

As pointed out in my earlier patents, referred to above, it is necessary for part of the water to be directed backwardly or upwardly toward the surface of the ground in order that the soil may be carried away rapidly enough to prevent the piling from sticking in going down. It has been discovered, however, that the lowermost row of side jets shown in Patent 1,241,813 can with advantage be made to assist in the cutting away of the soil around the forward end of the piling and that the flow of water around said end will be sufficient to raise the loosened soil up to a point where it will be carried on toward the surface of the earth by the force of the water rising from the remaining jets.

The action of the large bore, small nozzle device shown in my Patent No. 1,185,582, is improved by not providing the nozzle and then extending the large bore all the way through to the end. This large bore gives a stronger flow of water with additional cutting power. Similarly, increasing the size of bore of the earlier patents and omitting any nozzle has the same effect.

In the accompanying drawings I have illustrated a mechanical structure according to my invention, which will serve as means for carrying out the process of my invention and will refer thereto for clearness of description.

In the drawings:—

Figure 1:
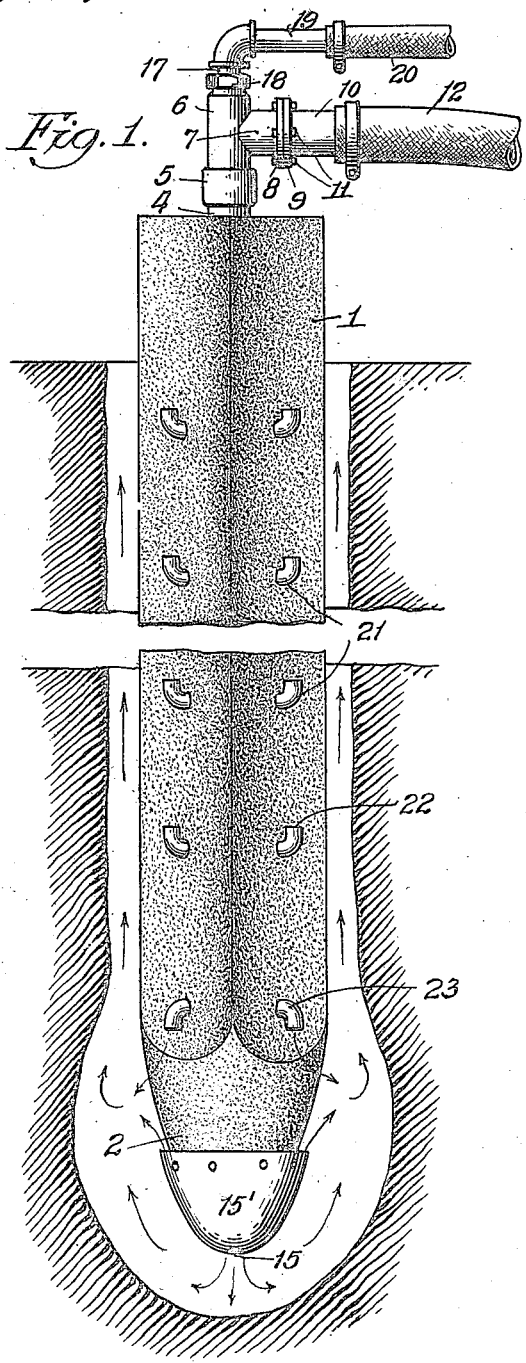
Fig. 1 is a corner elevation of piling adapted for use in accordance with my invention.
Figure 2:
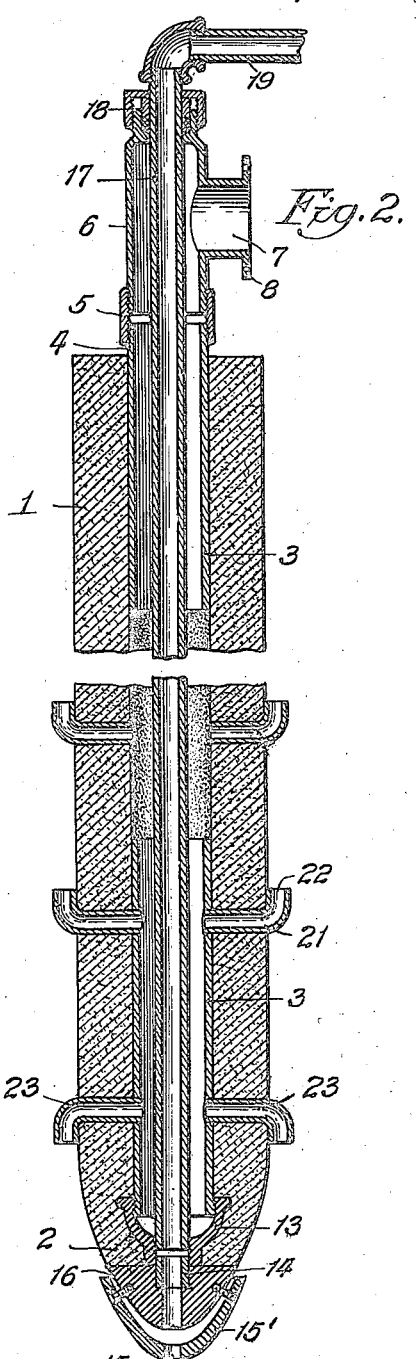
Fig. 2 is a vertical longitudinal section of the piling, showing connections for water supply pipes Referring more in detail to the drawings:—

1 designates a piling which is preferably constructed of cement or concrete, and is square in cross-section but provided with a convex lower end or nose 2. The piling is provided with an interior channel having a pipe lining 3, which terminates slightly within the lower nose 2 and projects slightly from the upper end to form a tip 4.

Mounted on the tip 4, preferably by means of a screw-threaded collar 5, is a connection 6 having an intake collar 7, provided with a flange 8 to which the flange 9 of a tip 10 is attached, preferably by the bolts 11, the tip 10 being in turn connected with a hose 12 which may extend to a source of water supply.

The lower end of the pipe 3 carries a reduction cap 13 and attached to said cap is a nozzle 14 which projects through the end of the piling, there being in alinement therewith an opening 15 (in cap 15') for producing a strong jet in advance of the piling when the latter is being sunk, and an annular, lateral opening 16 between the cap and piling tip for directing a head of water laterally and upwardly around the bottom of the pile, to hold the loosened earth back and direct it upwardly to the siphon jets.

Extending through the pipe 3 is a smaller pipe 17, the lower end of which is threaded into the reduction cap 13, and the upper end extended through a stuffing box 18, on the top of connection 6, and connected with a supply pipe 19, which, in turn, is fed through a hose 20 that also extends to a source of water supply, the hose 12 and 20 being provided with suitable controlling mechanism or valves (not shown).

Opening from the outer pipe 3, and extending through the body of the piling, are jet members 21, having upturned ends 22 lying close along the outer faces of the piling, so that when water is forced therethrough it will be directed upwardly in a plurality of jets, which are arranged at such close intervals relative to the excavating jet and to each other that material displaced by the excavating jet is stepped upwardly along the sides of the pile to the surface of the earth through which the pile is being sunk. The members 21 are preferably larger toward the bottom of the piles than near the top, as greater force is required at the bottom to lift the greater head of fluid and earth, although the invention need not be limited to the use of jet members of graduated diameter.

The lower circle of jet members or nozzles 23, instead of being turned upwardly, is turned downwardly and directs the water with considerable force against the curved wall in front of and laterally of the point of the piling, with the result that the hole being made is cut wider and more rapidly than if all the nozzles were directed upwardly as in the prior structures. Consequently, there is not the tendency toward lateral pressure on the tip of the pile which there is in structures not provided with the forwardly directed lateral jets.

With the equipment described, when a piling is to be sunk in the usual class of earth, such as sand, silt or any earth which will mix with or be displaced by water, the pile is upended at the point where it is to be sunk, and water forced into the large and small pipes, a greater pressure being preferably turned into the small pipe on account of the greater force required to dig a hole in advance of the piling than is necessary to carry upward the displaced material.

The water, being discharged through the small pipe in a strong jet, displaces the earth about the nose of the piling, so that the latter may sink to place of its own weight and water passing through the large pipe is forced laterally through the jet members 21 to be discharged downwardly and upwardly along the sides of the piling. The upturned jets displace material along the sides of the piling and force said material upwardly toward the surface, while the down-turned jets cut out the soil around the tip so that the same may be carried away and the piling be permitted to sink to place.

It is of course understood that the specific description of structure and method set forth above may be departed from without departing from the spirit of my invention as set forth in this specification and the appended claims.

Having thus described my invention, what I claim as new therein and desire to secure by Letters-Patent is:

1. In the art of sinking supporting structures the method which consists in forcibly ejecting a stream of water from the entering nose of the structure to loosen and dislodge the soil at the point thereof, directing a series of powerful jets downwardly along the sides of the structure adjacent the lower end thereof to coact with the first mentioned stream and effect a lateral enlargement of the opening caused by the latter, and ejecting a plurality of streams of water directly upwardly along the sides of the structure to carry dislodged soil away from the nose upwardly along the side of the structure to the top of the opening into which the structure is being sunk.

2. In the art of sinking supporting structures the method which consists in forcibly ejecting a stream of water from the entering nose of the structure to loosen and dislodge the soil at the point thereof, directing a series of powerful jets downwardly parallel with and along the sides of the structure adjacent the lower end thereof to coact with the first mentioned stream, and effect a lateral enlargement of the opening caused by the latter, and ejecting a plurality of streams of water directly upwardly along the sides of the structure to carry dislodged soil away from the nose upwardly along the side of the structure to the top of the opening into which the structure is being sunk.

3. A structure of the character described comprising an elongated body member, means for directing water under pressure in advance of the body member, said means comprising a plurality of jet nozzles extending laterally from the interior of the structure to the exterior thereof and then forwardly adjacent and encircling the forward end of the structure, and means for directing water upwardly along the sides of the body member to remove the material loosened by the aforesaid means.

4. A structure as defined in claim 3 having a forwardly directed nozzle centrally located at the end of the body member.

5. In a pile an elongated body portion, a downwardly directed nozzle located substantially centrally of the entering nose of the pile, means for conducting water under pressure to said nozzle, a plurality of series of powerful jets spaced along the sides of the pile throughout the greater portion of its length, the lowermost one of said series of jets being directed downwardly, and means for conducting water under pressure to said side jets under pressure, whereby powerful jets of water will be directed downwardly from the lower series to coact with the said nozzle to laterally enlarge the opening in the soil at the lower end of the pile, and to step the loosened soil upwardly along the sides of the pile to the top of the hole containing the same.

In witness whereof, I hereunto subscribe my name to this specification.

EDWARD BIGNELL.

Witness:
JOHN J. BOGAN.